United States Patent
De et al.

(10) Patent No.: US 10,338,837 B1
(45) Date of Patent: Jul. 2, 2019

(54) DYNAMIC MAPPING OF APPLICATIONS ON NVRAM/DRAM HYBRID MEMORY

(71) Applicant: QUALCOMM Incorporated, San Diego, CA (US)

(72) Inventors: Subrato Kumar De, San Diego, CA (US); Dexter Tamio Chun, San Diego, CA (US); Yanru Li, San Diego, CA (US); Bohuslav Rychlik, San Diego, CA (US); Richard Alan Stewart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/946,600

(22) Filed: Apr. 5, 2018

(51) Int. Cl.
*G06F 3/06* (2006.01)
*G06N 20/00* (2019.01)

(52) U.S. Cl.
CPC .......... *G06F 3/0631* (2013.01); *G06F 3/0604* (2013.01); *G06F 3/068* (2013.01); *G06N 20/00* (2019.01)

(58) Field of Classification Search
None
See application file for complete search history.

(56) References Cited

U.S. PATENT DOCUMENTS

| 9,569,125 | B2* | 2/2017 | Somers | G06F 3/0619 |
| 2008/0313482 | A1* | 12/2008 | Karlapalem | G06F 12/023 713/324 |
| 2013/0031327 | A1* | 1/2013 | Chang | G06F 12/0811 711/170 |
| 2014/0181503 | A1* | 6/2014 | Bettink | G06F 9/44 713/100 |
| 2017/0336973 | A1* | 11/2017 | Chakraborty | G06F 12/0607 |

* cited by examiner

*Primary Examiner* — Kevin Verbrugge
(74) *Attorney, Agent, or Firm* — Patterson & Sheridan, LLP (57) ABSTRACT

This disclosure relates to allocating memory resources of a computing device comprising non-volatile random access memory (NVRAM) and dynamic random access memory (DRAM). An exemplary method is performed for every independently executable component of an application and includes determining attributes of the component. The method also includes associating the component with a memory profile of a plurality of memory profiles based on the attributes, wherein each memory profile of the plurality of memory profiles specifies a number of banks of the NVRAM and a number of banks of the DRAM. The method also includes causing the computing device to generate an assignment of the component to banks of the NVRAM and DRAM based on the memory profile associated with the component so the computing device can execute the component using the banks of the NVRAM and DRAM based on the assignment.

20 Claims, 8 Drawing Sheets

DYNAMIC MAPPING OF APPLICATIONS ON NVRAM/DRAM HYBRID MEMORY

FIELD

The present disclosure relates generally to executing applications on computing devices, and more particularly to mapping applications to specific sections of computer memory.

BACKGROUND

Computing devices typically utilize three categories of memory; slow-speed, high-capacity storage memory, faster, lower-capacity main memory, and even faster and lower-capacity cache memory. Main memory is typically used by a processor during execution of an application to store data for the application and access previously stored data for the application. Thus, the performance and capabilities of main memory have a significant impact on the performance and efficiency of applications and computing devices.

Because main memory greatly benefits from being able to read and write data non-sequentially, modern computing devices use random access memory (RAM) for main memory. Dynamic random access memory (DRAM) is one example of a type of RAM used as main memory. DRAM may need to be refreshed periodically to keep the data stored from being lost. DRAM is also volatile memory, meaning the information stored on DRAM is lost when the memory is powered off. Accordingly, non-volatile random access memory (NVRAM) is another type of RAM that can be used as part of some computer main memory systems. Because NVRAM is non-volatile, it keeps the information stored even when powered off. NVRAM also has different read and write speeds when compared to DRAM.

In certain computing devices, a combination of NVRAM and DRAM may be used to provide main memory for the computing devices. When using NVRAM as part of main memory, it may be desirable to determine which applications run most efficiently using NVRAM and which applications run most efficiently using DRAM, in order to allocate memory resources between applications more efficiently. However, merely allocating only NVRAM or only DRAM to an application for use may not result in an efficient memory allocation. Therefore, systems and methods are needed for applications to be mapped to DRAM and NVRAM more effectively and efficiently.

SUMMARY

One embodiment of the present disclosure provides a method for allocating memory resources of a computing device comprising non-volatile random access memory (NVRAM) and dynamic random access memory (DRAM). The method is performed for each of one or more components of one or more applications to be executed on the computing device, wherein each of the one or more components comprises an independently executable portion of the one or more applications. The method includes determining attributes of the component. The method also includes associating the component with a memory profile of a plurality of memory profiles based on the attributes, wherein each memory profile of the plurality of memory profiles specifies a number of banks of the NVRAM and a number of banks of the DRAM. The method also includes causing the computing device to generate an assignment of the component to banks of the NVRAM and DRAM based on the memory profile associated with the component so the computing device can execute the component using the banks of the NVRAM and DRAM based on the assignment.

Another embodiment of the present disclosure provides a system comprising a processor and a memory comprising executable instructions, which when executed by the processor, cause the system to perform an operation for allocating memory resources of a computing device comprising non-volatile random access memory (NVRAM) and dynamic random access memory (DRAM). The operation is performed for each of one or more components of one or more applications to be executed on the computing device, wherein each of the one or more components comprises an independently executable portion of the one or more applications. The operation includes determining attributes of the component. The operation also includes associating the component with a memory profile of a plurality of memory profiles based on the attributes, wherein each memory profile of the plurality of memory profiles specifies a number of banks of the NVRAM and a number of banks of the DRAM. The operation also includes causing the computing device to generate an assignment of the component to banks of the NVRAM and DRAM based on the memory profile associated with the component so the computing device can execute the component using the banks of the NVRAM and DRAM based on the assignment.

Still another embodiment of the present disclosure provides a non-transitory computer-readable storage medium storing instructions, which, when executed on a processor, perform a method for allocating memory resources of a computing device comprising non-volatile random access memory (NVRAM) and dynamic random access memory (DRAM). The method is performed for each of one or more components of one or more applications to be executed on the computing device, wherein each of the one or more components comprises an independently executable portion of the one or more applications. The method includes determining attributes of the component. The method also includes associating the component with a memory profile of a plurality of memory profiles based on the attributes, wherein each memory profile of the plurality of memory profiles specifies a number of banks of the NVRAM and a number of banks of the DRAM. The method also includes causing the computing device to generate an assignment of the component to banks of the NVRAM and DRAM based on the memory profile associated with the component so the computing device can execute the component using the banks of the NVRAM and DRAM based on the assignment.

Aspects generally include methods, apparatus, systems, computer program products, computer-readable medium, and processing systems, as substantially described herein with reference to and as illustrated by the accompanying drawings.

DETAILED DESCRIPTION

Computer main memory systems, such as those of portable battery-powered devices (e.g., smartphones), may incorporate NVRAM as part of the overall main memory as NVRAM may be more power-efficient than DRAM. DRAM needs to be periodically refreshed to keep data stored on the DRAM from deteriorating (e.g., being corrupted or lost), typically at least several times a second, while NVRAM does not need to be refreshed periodically. As a result, NVRAM typically consumes less power than DRAM does in a standby state. A standby state of RAM is an operation state of RAM between active operations (i.e. read and write operations). For example, during the time between a write operation for RAM and a subsequent operation for the same RAM, the RAM is in a standby state. Because NVRAM typically consumes less power than DRAM in a standby state, applications which result in significant periods of standby states for RAM (which may be true if an application executes for a long period of time) may consume less power executing using NVRAM rather than DRAM.

NVRAM also may consume less power during boot time, as it is non-volatile and data stored persists through power being lost. Accordingly, data does not need to be rewritten to NVRAM during boot when the device is powered back on after powering down, such as needed in the case of DRAM, thereby avoiding power costs of performing the write to main memory during boot. Because NVRAM is in general more power-efficient, a computing device may benefit from applications using NVRAM over DRAM if such use of NVRAM allows banks of DRAM to be turned off, thus saving battery power. This may be especially true of applications which execute for a relatively long period of time, as the longer an application executes the more power it consumes, and thus there may be greater power savings by executing such an application using NVRAM.

However, DRAM also has advantages over NVRAM. In particular, while DRAM and NVRAM may read data at comparable rates, DRAM may write data much faster. Further, DRAM can be written to without failing many more times than NVRAM, meaning the useful life of a bank of NVRAM will be less than a bank of DRAM if both are subjected to the same number of write operations. Even further, although NVRAM may be more power efficient than DRAM generally, a write operation on NVRAM may consume more power than a write operation on DRAM. Therefore, applications that perform many write operations may be better suited to use DRAM, while applications that perform few write operations but many read operations may be better suited to use NVRAM.

Further, NVRAM may be more expensive than DRAM. As a result, memory systems that do make use of both NVRAM and DRAM may use NVRAM as a lesser or even minor part of the overall memory. If so, the space available in NVRAM may be limited, meaning larger applications that take up a great deal of space may be better allocated to DRAM over NVRAM, even if such an application would otherwise be suitable for NVRAM.

In general, it may be preferable for applications to use NVRAM if an application needs to use the same data after any given boot procedure, or needs to stay in memory for a long time, as in both cases execution using NVRAM may consume less power than execution using DRAM. This may be true unless a limitation of NVRAM outweighs the benefits of using NVRAM as compared to DRAM for execution of a particular application. As examples, an application may be in some respects suitable for execution using NVRAM, but if the application performs many write operations the application may be better executed using DRAM. Execution of an application using DRAM may also be preferred if the application requires a great deal of space in memory. Accordingly, aspects herein relate to using such principles of NVRAM and DRAM to assign applications to either NVRAM or DRAM resulting in more efficient operation.

However, a given application may only occasionally consist entirely of functions, threads, and libraries, which are all best executed using either NVRAM or DRAM. The functions, threads, and libraries of an application may be referred to generally as application units. An application may also include other similar application units. Each application unit may be an independently executable portion of an application. The application units may be grouped into independently executable portions of the application such that inter-group communication is minimized, as further discussed. Minimizing inter-group communication generally means separating application units such that units of one group do not communicate extensively with application units of other groups, while intra-group communication may be robust. Such groups may be called components of the application. In certain aspects, if components are individually tested for suitability of either NVRAM or DRAM assignment (i.e., a component being assigned to NVRAM or DRAM means that the component uses the assigned to NVRAM or DRAM for execution), a more efficient mapping of memory resources may be obtained. In certain aspects, components may be tested for assignment based on static analysis of the components (e.g., during compilation of the application) and/or based on actual execution of the components, meaning the suitability of NVRAM or DRAM assignment may be evaluated and changed over time. A component which is suited for assignment to NVRAM may be referred to as an NVRAM component, while a component which is suited for assignment to DRAM may be referred to as a DRAM component.

In certain aspects, an application may first be divided into components. For example, a computing device may be configured to divide the application into components, such as during compilation of the application. The application may be divided into components by determining how units of an application communicate with each other, such as by examining the code of the application to determine when calls are made between units, when data is shared between units, dependencies between units, etc. Communication between units generally refers to output from one unit being used as input for a different unit, or data stored by one unit being used by a different unit. For example, a first application unit may be a function that generates a pseudo-random number. A second unit may be a function which uses a number generated by the first application unit to select a character indexed by the number. When the second unit calls the first unit for this number, this is a communication. As another example, a unit may be a library storing data. A different unit may be a function which uses information stored in the library. When the function accesses the library, this is also a communication. Units which communicate frequently (e.g., satisfy at least a threshold) may be included in the same component, while units which communicate infrequently (e.g., do not satisfy at least the threshold) may be included in separate components. For example, a certain function of an application may be in frequent communication with a certain library and therefore the function and library may be included in the same component. Alternatively, a different function may infrequently or never communicate with the certain library, and therefore the different function and the library may be included in separate components. A component may be as large as the entire application (if the application has no easily severable parts) or as small as a single function, thread, or library.

In certain aspects, a call graph of the application may be generated to represent and analyze the various communications between application units. A call graph is a graph with nodes representing units of an application, and directed edges between those nodes representing an instance of the unit represented by the source node communicating with (or calling) the unit represented by the destination node. By generating a call graph of the application, it may be possible to determine which units do not communicate (and which can be safely separated) and which units communicate extensively (and which may be grouped into a single component).

In certain aspects, when the application is divided into components, each component may be analyzed based on various criteria, such as an access ratio of the component, a size of the component, etc. An access ratio may be a ratio of read operations to write operations (a read/write ratio). For example, the components may be analyzed by a computing device. Based on this analysis, each component may receive an initial determination of suitability for either NVRAM assignment or DRAM assignment, which may be referred to as a mapping of components to NVRAM or DRAM. When each component has been analyzed, a hardware profile may be determined for the application as a whole. A hardware profile refers to a combination of NVRAM banks and DRAM banks available for use. As examples, a first hardware profile may be every NVRAM bank active and no DRAM banks active, a second hardware profile may be every DRAM bank active and no NVRAM bank active, while other hardware profiles may be combinations of active NVRAM banks and DRAM banks.

In certain aspects, the mapping of components to NVRAM or DRAM uses static information that may be obtained by a compiler analyzing code of an application. However, mappings may also be created or updated based on dynamic information obtained at runtime. In particular, information about power consumption of a component may be obtained at execution, while this information could not be obtained at compilation. When the component is executed, a dynamic access ratio may also be determined. By using the dynamic access ratio and the power consumption, the suitability of the component for assignment to either NVRAM or DRAM may be reevaluated. If the assignment is reevaluated, a new hardware profile may be determined for the application and the component mappings updated.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Accordingly, in one or more exemplary embodiments, the functions described may be implemented in hardware, software, or combinations thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, optical disk storage, magnetic disk storage or other magnetic storage devices, or any other medium that can be used to carry or store desired program code in the form of instructions or data structures and that can be accessed by a computer.

Figure 1:
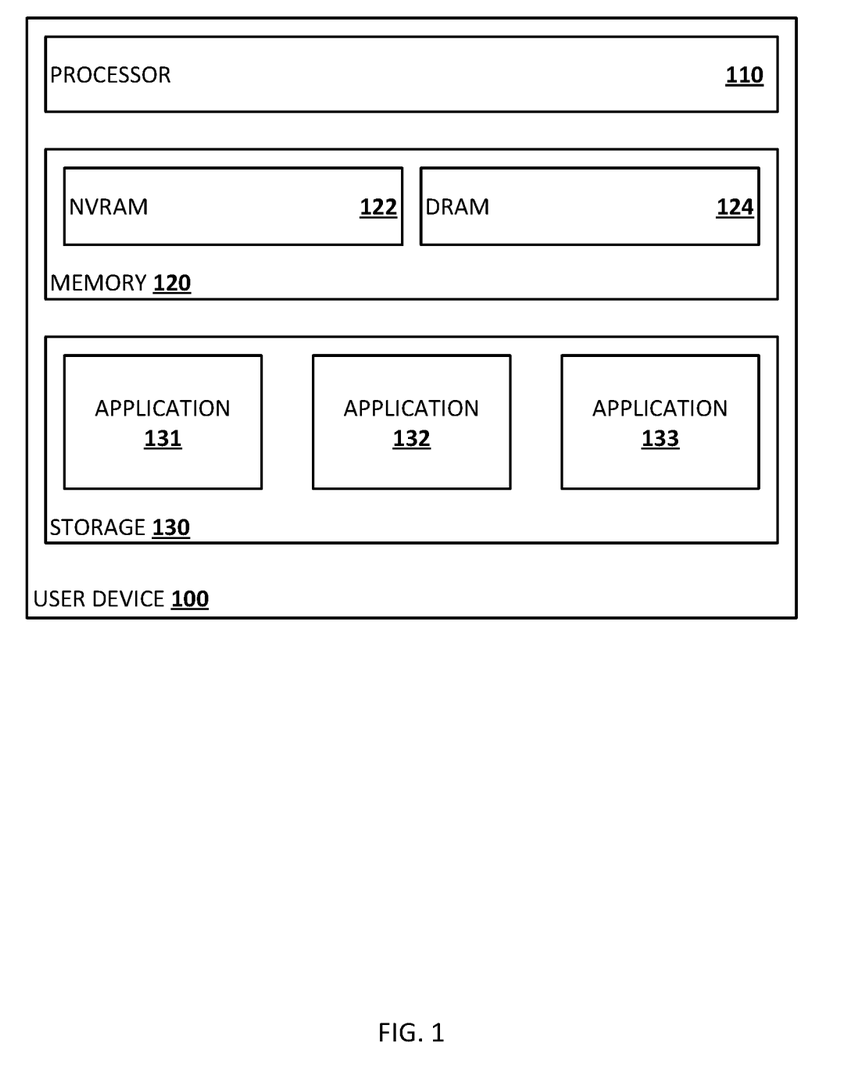
FIG. 1 illustrates an example user device according to one embodiment.

FIG. 1 illustrates an example user device 100 according to one embodiment. As illustrated, user device 100 may include processor 110, memory 120 and storage 130. Processor 110 may be used to execute instructions, in particular, instructions of applications, such as applications 131-133 located in storage 130.

Memory 120 may generally be main memory for user device 100. Memory 120 may be manipulated by processor 110. That is, data may be written to memory 120 and data may be read from memory 120 based on instructions executed by processor 110. Processor 110 is included to be representative of a single central processing unit (CPU), multiple CPUs, a single CPU having multiple processing cores, and the like. Memory 120 may include non-volatile random access memory (NVRAM) 122 and dynamic random access memory (DRAM) 124. NVRAM 122 and DRAM 124 may be generally used as main memory for user device 100, but may each have different advantages and disadvantages as discussed. As illustrated, although user device 100 makes use of both NVRAM 122 and DRAM 124, the two memory types may comprise a single memory 120. Though only one processor 110 is shown as using one memory 120 and executing applications, it should be noted that in user device 100, multiple processors may share memory 120, multiple processors may access multiple main memories, processor 110 may access multiple main memories, and different application units may execute across multiple processors or processing cores or execute across multiple main memories.

Storage 130 may be used as long-term storage for user device 100. Storage 130 may be a non-volatile storage such as one or more solid state drives (SSDs), peripheral component interconnect (PCI) based flash storages, serial AT attachment (SATA) connected drives, serial attached small computer system interface (SAS) magnetic disks, etc. Although shown as a single unit, storage 130 may be a combination of fixed and/or removable storage devices, such as fixed drives, removable memory cards, network attached storage (NAS), or cloud-based storage. As illustrated, storage 130 may include stored data such as a plurality of applications, including applications 131-133. Although three applications 131-133 are shown, there may be any number of applications stored in storage 130. Execution of applications 131-133 may include processor 110 moving application-related data from storage 130 to memory 120, and executing instructions of the application to read and/or write data to memory 120.

Each application of applications 131-133 may be executed using NVRAM 122 and DRAM 124, and each application may have a type of RAM which it may execute more efficiently when using. For example, application 131 may execute more efficiently using NVRAM 122 while application 132 may execute more efficiently using DRAM 124. If the type of RAM that an application executes more efficiently when using is known, processor 110 may move the application to that RAM type (either NVRAM 122 or DRAM 124) and execute the application using that RAM type. As described in further detail below, an application may also be executed using both NVRAM 122 and DRAM 124, by executing portions (e.g., components) of the application using different RAM types.

Figure 2A:
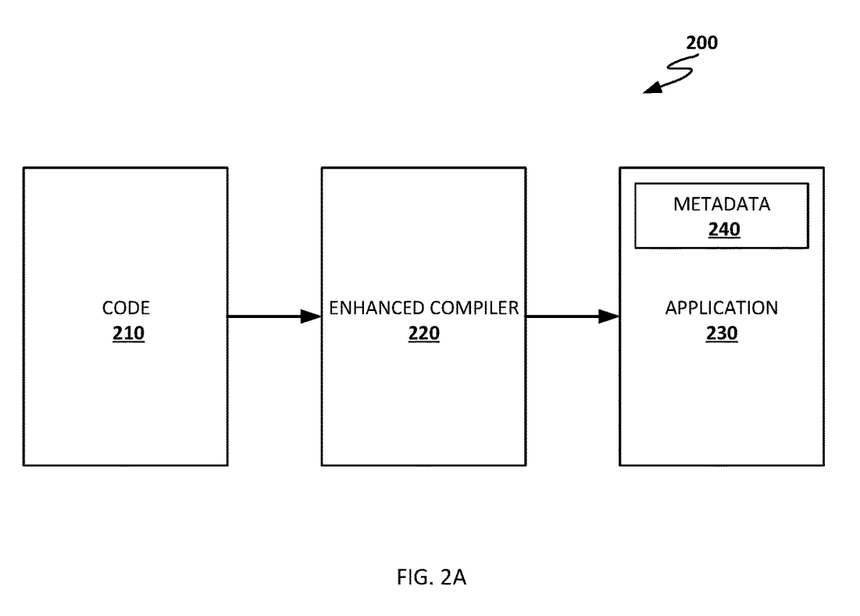
FIG. 2A is a diagram of a simplified process for generating an application in accordance with one embodiment.

FIG. 2A is a diagram of a simplified process 200 for generating application 230 in accordance with one embodiment. Process 200 includes code 210, enhanced compiler 220, and application 230.

Code 210 may comprise the human-readable definitions written by a developer, which, when compiled will comprise the computer-readable instructions needed to execute an application. Code 210 may include definitions for various functions, threads and libraries of application 230. Code 210 may also include developer provided hints relating to a type of RAM which application 230 should us for execution.

Enhanced compiler 220 generally converts code 210 from human-readable definitions to computer-readable instructions, a process referred to as compilation. Enhanced compiler 220 may also analyze code 210 to determine components of application 230. As discussed, determining components of an application may involve measuring communication requirements between different units of the application.

In certain aspects, enhanced compiler 220 may also insert instrumentation at the beginning and end of each component (as defined in code 210) to measure dynamic data based on execution of the components. Dynamic data may include execution-measured read and write operations, execution timings measured in real time, CPU cycles, and component power consumption. In particular, as discussed, the mapping of components of application 230 to NVRAM or DRAM may be based on static information about the components obtained by enhanced compiler 220 and/or may be based on dynamic information obtained from execution of application 230. The instrumentation inserted by enhanced compiler 220 may be used to obtain such dynamic information for generating/updating such mappings.

Figure 2B:
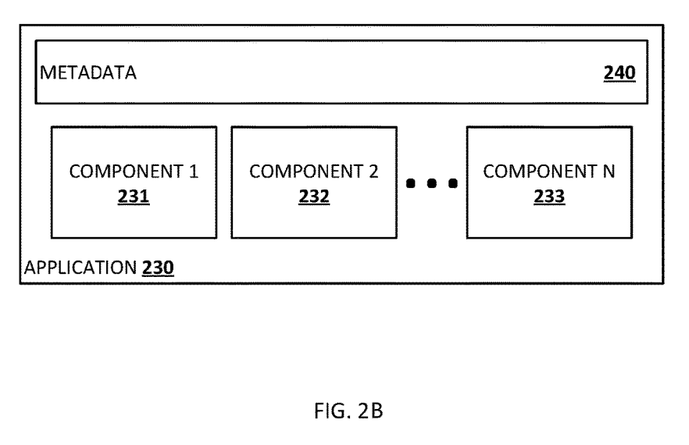
FIG. 2B illustrates an example application.

FIG. 2B illustrates an example application 230. Application 230 may be produced by the process of FIG. 2A. As illustrated, application 230 includes metadata 240, as well as a plurality of components, including components 231-233. Although three components 231-233 are shown application 230 may have any number of components. Components 231-233 may be determined by enhanced compiler 220 based on communication requirements between units of the application 230.

Although metadata 240 is illustrated as part of application 230, in some embodiments the information of metadata 240 may be stored separately or outside of application 230. Metadata 240 may include information indicative of assignments between each component 231-233 and a type of RAM and/or attributes of components 231-233. Attributes of a component may refer to communication restraints of a component, the access ratio of a component, the size of a component, power consumption of a component, etc. Power consumption may be measurable at execution and unavailable at compilation. Metadata 240 may also include a mapping of application 230 to a hardware profile.

Figure 3:
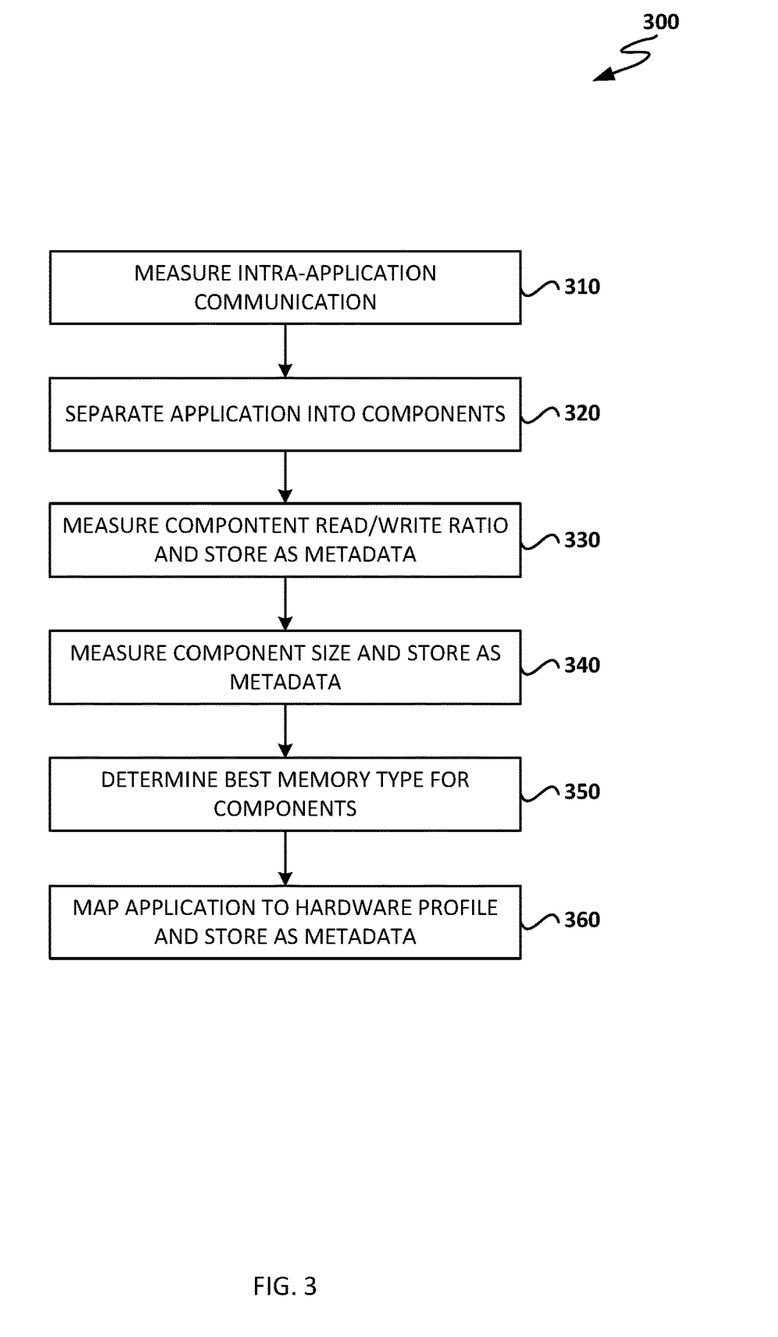
FIG. 3 illustrates example operations for allocating memory resources based on static parameters.

FIG. 3 illustrates example operations 300 for the allocation of memory resources based on static parameters. Operations 300 may be performed by a mapper, which may correspond to mapper 420 of FIG. 4. The mapper may be executed by a computing device.

Operations 300 begin at block 310, where the mapper measures intra-application communication restraints of an application. In some embodiments, the steps of blocks 310-340 may be performed by an enhanced compiler, such as enhanced compiler 220 of FIG. 2A. In some embodiments, these steps may be performed by the mapper or a part thereof. Measurement of intra-application communication restraints may include generating a call graph of the application for analysis. For example, one function of an application using output from a different function is a communication restraint between those functions. In general, a communication restraint indicates that even though two application units may be severable, there may be enough inter-unit communications so as to defeat any advantages from executing the two parts using separate RAM banks.

At block 320, the mapper separates the application into components, based on the communication restraints identified at block 310. For example, in certain aspects, if two units have more than a threshold amount of inter-unit communication, the two units are included in the same component. If two units have less than a threshold amount of inter-unit communication, the two units are included in separate components. As an example, if two functions of an application do not contain instructions calling one another, the two functions may be grouped into separate components. Conversely, in certain aspects, if a unit has more than a threshold amount of inter-unit communication with any unit in a component, the unit is included in the component. For example, a function of an application may make frequent use of a library of an application. If so, the function and the library may be grouped into one component. Otherwise, if a unit has less than a threshold amount of inter-unit communication with every unit in a component, the unit is not included in the component. Following from the previous example, a second function which does not call the function or make use of the library may be grouped into a separate component from the function and the library.

At block 330, the mapper measures the read/write ratios of each component. This may be done by counting the number of read instructions and write instructions present in the application code corresponding to each component. If a component has significantly more read instructions than write instructions (e.g., the ratio of read to write is above a threshold) it is said to be read-intensive. If a component has significantly more write instructions than read instructions (e.g., the ratio of read to write is below a threshold that may be a different threshold than for determining if it is read-intensive) it is said to be write-intensive. Read-intensive components may execute more efficiently using NVRAM and write-intensive components may execute more efficiently using DRAM. After measuring the read/write ratios, the measured ratios are stored as metadata of the application.

At block 340, the mapper measures the size, in bytes, of each component. Larger components may be ill-suited for NVRAM execution, as there may be a limited number of NVRAM banks available. After measuring the size, the measured sizes are stored as metadata of the application.

At block 350, the mapper determines a memory type for each component, based on component attributes. The step of block 350 may be performed by a learning algorithm of the mapper. The learning algorithm uses the available component attributes, previously stored as metadata, to determine which of NVRAM or DRAM is a better execution RAM for a given component. A component which was determined to execute more effectively using NVRAM may be called an NVRAM component. A component which was determined to execute more effectively using DRAM may be called a DRAM component.

Determining the memory type for a component may be a relative operation. That is, the classification of a component may be based on the measured attributes of other components rather than on arbitrary values of attributes. For example, a component may be determined to be appropriate for NVRAM execution because it is significantly smaller than other measured components rather than because the component is below a certain threshold size. Similarly, a component may be determined to be appropriate for NVRAM execution because the component is significantly more read-intensive than other measured components rather than because the component is above a certain threshold read intensity.

Avoiding the use of arbitrary values for memory classification may benefit execution overall if the values are a poor fit for the set of components executing on a given user device. For example, if using arbitrary values, a given user device may have only DRAM components, which would result in non-use or under-use of available banks of NVRAM. By instead classifying components relative to other components, the entire main memory may be better utilized as more banks of RAM may be available for allocation.

Classification of components may involve multi-class or multinomial classification. Multi-class classification refers to solutions to the problem of sorting objects into one of more than two classes. For application components, multi-class classification means that components may be classified, instead of into two groups (NVRAM and DRAM), along a spectrum of suitability for execution on NVRAM or DRAM. If so, at execution time, a user device may be able to assign components which are not strongly suited for application on either NVRAM or DRAM to whichever memory type has more available space at run-time.

In some embodiments, determining the best memory type for components involves organizing a plurality of components, which may together comprise all of the applications which execute on a given device, into clusters. Such organization may be called clustering. Clustering components may facilitate determining what type of memory an individual component is best suited for. Generally, as many clusters may be created as there are possible hardware profiles for a given device.

At block 360, the mapper maps the application to a hardware profile based on the determinations of the memory type for each component. The step of block 360 may also be performed by a learning algorithm of the mapper. A hardware profile specifies a number and combination of NVRAM and DRAM banks available for execution of an application. For example, an application which includes only NVRAM components may be mapped to a hardware profile specifying only NVRAM banks for use, while an application which includes only DRAM components may be mapped to a hardware profile specifying only DRAM banks for use. An application including both NVRAM and DRAM components may be mapped to a hardware profile specifying both NVRAM and DRAM banks for use.

Mapping applications to hardware profiles may involve multi-label classification. Multi-label classification refers to solutions to the problem of sorting objects into all suitable classes of more than two classes. For applications, multi-label classification means that components may be classified as suitable for a number of different hardware profiles. If so, applications may have an ordered list of hardware profiles suitable for execution, in order of preference of execution. Secondary preference hardware profiles may be utilized if the banks of RAM needed for a primary preference hardware profile are not available for use at the time of execution. After mapping the application to a hardware profile, the learning algorithm stores the mapping as metadata of the application.

Figure 4:
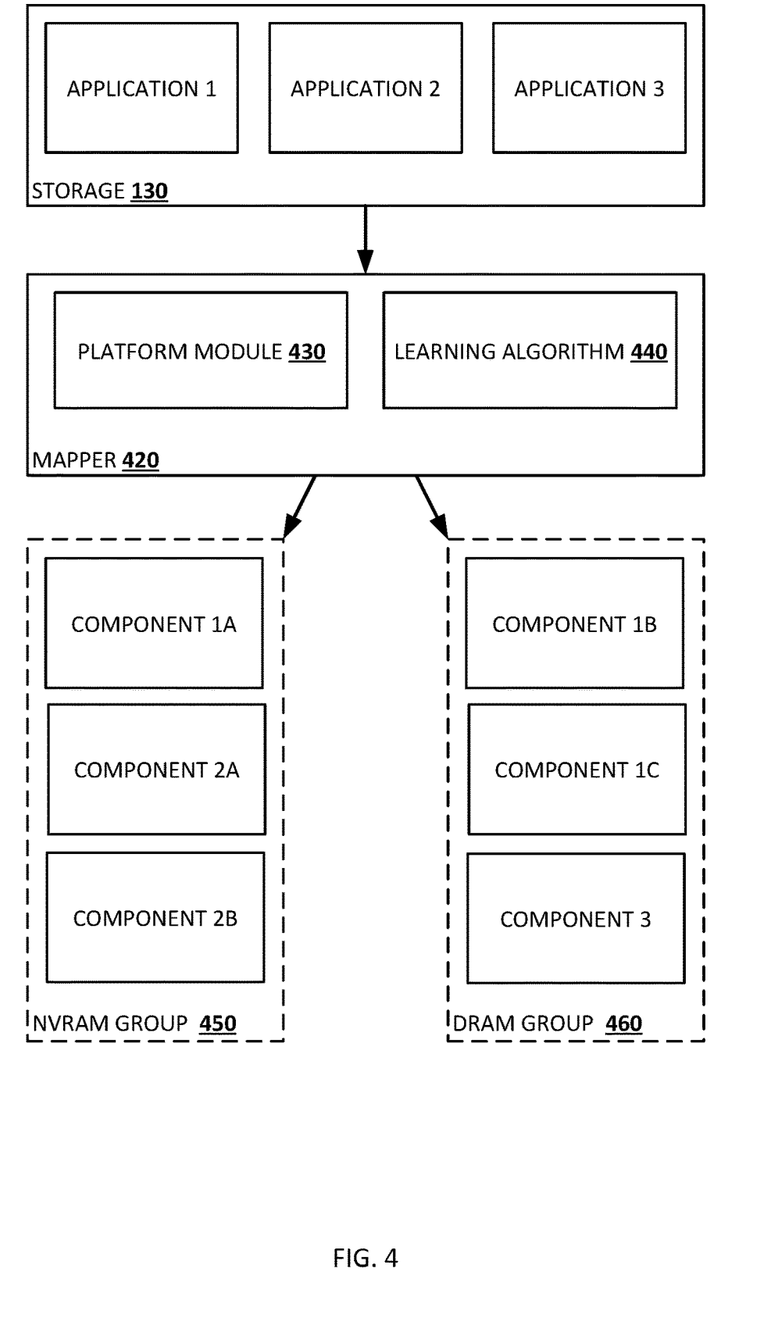
FIG. 4 is a simplified diagram of a learning algorithm organizing application components into execution groups.

FIG. 4 is a simplified diagram of mapper 420 organizing application components into execution groups 450 and 460. As illustrated, mapper 420 includes platform module 430 and learning algorithm 440. Platform module 430 may be able to interact with the hardware of the device that mapper 420 executes on, and may be able to access component attributes available through the device hardware. Platform module 430 may, in some embodiments, perform the functions of an enhanced compiler, such as enhanced compiler 220 of FIG. 2. Learning algorithm 440 processes and categorizes application components, and also maps applications to hardware profiles. Mapper 420 is shown as a single entity, but in different embodiments, mapper 420 or the functions thereof may be distributed across multiple computing devices in communication over a network, or contained within a single computing device, including a user device executing applications to be sorted by mapper 420.

The action illustrated by FIG. 4 may generally correspond to the operations of blocks 310-350 of FIG. 3. The operation of blocks 310-350 of FIG. 3 generally apply to sorting application components of a single application, while FIG. 4 generally illustrates organizing application components of multiple applications. The same principles apply to either situation, and mapper 420 may be able to organize application components of a single application just as well as mapper 420 organizes application components of multiple applications. As illustrated, mapper 420 may take applications 1-3 (e.g., stored in storage 130 of FIG. 1) and separate applications 1-3 into components. Application 1 corresponds to component 1A, component 1B and component 1C. Application 2 corresponds to component 2A and component 2B. Application 3 corresponds to, and may be co-extensive with, component 3.

Mapper 420 may first separate applications 1-3 into components, if the applications have not already been separated. This may be done by platform module 430. If platform module 430 separates the applications into components, platform module 430 may measure the communication restraints between different units of the applications. Platform module 430 may then group units of the applications into components based on those communication restraints, and may delineate the bounds of components by minimizing the communication requirements between different components. An enhanced compiler may be used to perform separation of applications into components, in some embodiments.

After determining the components of the applications, platform module 430 may measure attributes of the components. For example, if using static data, platform module 430 may measure the size of the components as well as the number of read instructions and write instructions of the components, as defined by code defining the application. If using dynamic data, platform module 430 may measure the power consumption of the components as well as the number of read operations and write operations performed by each component. The enhanced compiler may also be used to measures static attributes of components in some embodiments.

After measuring the components, mapper 420 determines which type of RAM each component may execute more effectively on. Learning algorithm 440 may be used to perform this task. Learning algorithm 440 may associate each component to a RAM type (either NVRAM or DRAM) and may include these associations in metadata of the corresponding application. That is, after such an association, a component may be either an NVRAM component or a DRAM component. NVRAM components are grouped together in NVRAM group 450, and DRAM components are grouped together in DRAM group 460. As illustrated component 1A, component 2A and component 2B are NVRAM components as they are in NVRAM group 450. Component 1B, component 1C and component 3 are DRAM components as they are in DRAM group 460.

Based on the associations of components to RAM types, learning algorithm 440 may also map an application to a hardware profile. A hardware profile specifies a number of banks of NVRAM and DRAM available for use for an application. For example, application 1 may be mapped to a first hardware profile of one or more banks of NVRAM and one or more banks of DRAM as application 1 includes an NVRAM component (component 1A) and two DRAM components (component 1B and component 1C). The first hardware profile may have more DRAM banks than NVRAM banks as application 1 has more DRAM components than NVRAM components. In some cases, the first hardware profile may have exactly one NVRAM bank and two DRAM banks. The assignment of banks to components may not always be one-to-one, however. In fact, as size is an attribute used to classify components, it may often be the case that a given DRAM component requires more banks of DRAM than a given NVRAM component requires banks of NVRAM. It may even be the case that an application with a multitude of NVRAM components and only a single DRAM component is assigned to a hardware profile of more DRAM banks than NVRAM banks, if the single DRAM component is sufficiently large. As another example, application 2 may be mapped to a hardware profile of banks of NVRAM only, as application 2 includes two NVRAM components (component 2A and component 2B) and no DRAM components.

Learning algorithm 440 may include a mapping of an application to a hardware profile in metadata of the application. If an application includes only a single component, the RAM type association of that component may dictate a hardware profile mapped to the application. For example, application 3 includes only a single component, component 3. Since component 3 is a DRAM component, application 3 may be mapped to a hardware profile including only banks of DRAM.

Figure 5:
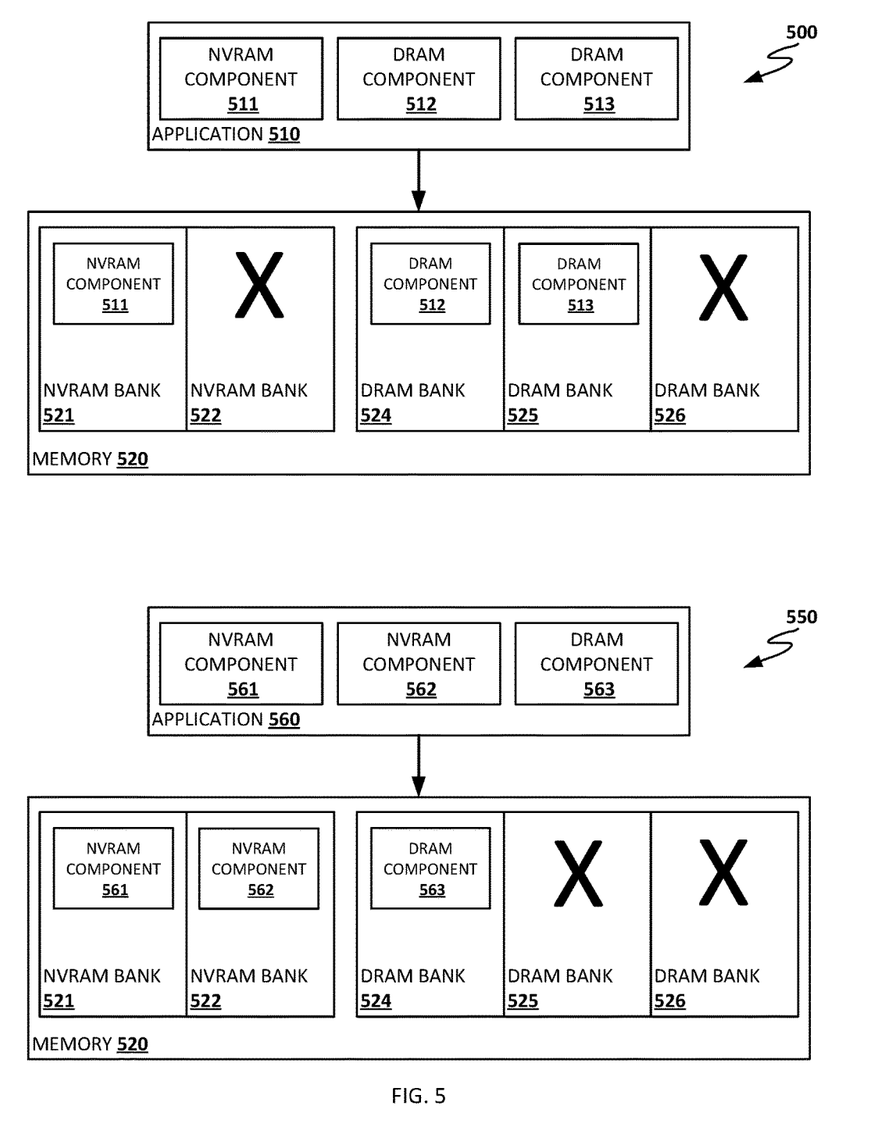
FIG. 5 demonstrates two example applications executing according to different hardware profiles.

FIG. 5 demonstrates two example applications 510 and 560 executing according to different hardware profiles 500 and 550.

A hardware profile specifies a number of banks of NVRAM of memory of a computer device and a number of banks of DRAM of memory of a computer device for execution of an application. Memory 520 is illustrated with two banks of NVRAM 521 and 522 and three banks of DRAM 524-526, although other possible numbers and combinations of NVRAM banks and DRAM banks are possible. Hardware profile 500 may specify one bank of NVRAM (NVRAM bank 521) and two banks of DRAM (DRAM bank 524 and DRAM bank 525). NVRAM bank 522 and DRAM bank 526 are shown with an X to illustrate that NVRAM bank 522 and DRAM bank 526 are not used in hardware profile 500, and are thus not available for assignment of components of an application mapped to hardware profile 500.

Application 510 includes three components, NVRAM component 511, DRAM component 512 and DRAM component 513. Each component 511-513 may be an independently executable portion of application 510. At either compilation or execution, application 510 may be mapped to hardware profile 500 for execution, as application 510 includes one NVRAM component and two DRAM components, and hardware profile 500 specifies one bank of NVRAM and two banks of DRAM. As a result, if application 510 is executed according to hardware profile 500, NVRAM component 511 may execute using NVRAM bank 521, DRAM component 512 may execute using DRAM bank 524 and DRAM component 513 may execute using DRAM bank 525. For ease of explanation and illustration, each component is shown executing using one bank of RAM. However, in practice, a component may execute using multiple banks of RAM if the component is sufficiently large, or multiple components may execute using a single bank of RAM if the components are sufficiently small.

In hardware profile 550, memory 520 includes the same banks of RAM as with hardware profile 500. Hardware profile 550 specifies two banks of NVRAM (NVRAM bank 521 and NVRAM bank 522) and one bank of DRAM (DRAM bank 524). DRAM bank 525 and DRAM bank 526 are shown with an X to illustrate that DRAM bank 525 and DRAM bank 526 are not used in hardware profile 550.

Application 560 includes three components: NVRAM component 561, NVRAM component 562 and DRAM component 563. Application 560 may be mapped to hardware profile 550 as application 560 includes two NRAM components and one DRAM component, and hardware profile 550 specifies two banks of NVRAM and one bank of DRAM. If application 560 is executed according to hardware profile 550, NVRAM component 561 may execute using NVRAM bank 521, NVRAM component 562 may execute using NVRAM bank 522 and DRAM component 563 may execute using DRAM bank 524.

In this example, only two hardware profiles are shown, but others are possible, including hardware profiles that specify only NVRAM banks and hardware profiles that specify only DRAM banks. Further, each bank of RAM is shown as executing only a single component but multiple components may be executable using a single bank of RAM. For example, with respect to hardware profile 500, if both DRAM component 512 and DRAM component 513 are sufficiently small, DRAM component 512 and DRAM component 513 may both execute using a single bank of RAM, such as DRAM bank 524.

Figure 6:
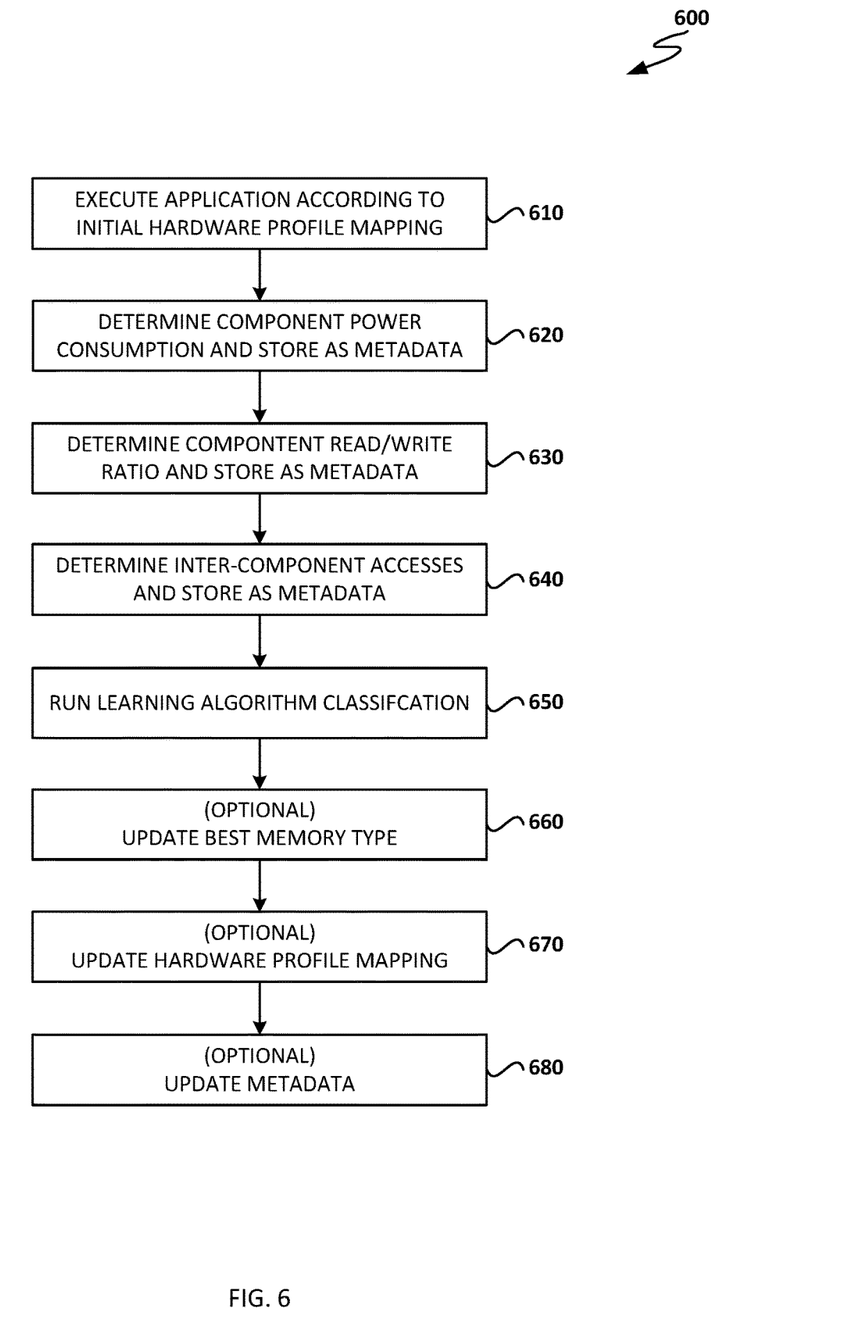
FIG. 6 illustrates example operations for allocating memory resources based on dynamic parameters.

FIG. 6 illustrates example operations 600 for a mapper to allocate memory resources based on dynamic parameters. The mapper may include a platform module corresponding to platform module 430 of FIG. 4 and a learning algorithm may corresponding to learning algorithm 440 of FIG. 4.

Operations 600 begin at block 610, where an application is executed according to an initial hardware profile mapping. An initial hardware profile mapping may be obtained by measuring static parameters of the application. Further, the initial hardware profile mapping may itself be obtained by a previous measurement of dynamic parameters.

At block 620, the mapper, using the platform module, determines the power consumed by each component of the application. Power consumption may correspond to a length of time that a component executes. Generally, the longer a component is resident in RAM, especially DRAM, the component may consume more power. Components with high power consumption may consume less power when executed using NVRAM compared to DRAM. The determined power consumption is then stored as metadata.

At block 630, the platform module determines the read/write ratios of each component. This may be done by counting the number of read operations and write operations executed by each component. The determined read/write ratios are then stored as metadata.

At block 640, the platform module determines the number of instances of each component accessing other components. If two components execute using different RAM banks based on the initial hardware profile mapping but communicate extensively, benefits of executing the two components separately may be outweighed by costs of communicating across RAM banks. If so, it may be more efficient for the two components to execute using a single RAM bank despite individually executing more efficiently using different kinds of RAM. Further, communication may be determined to be so frequent between the two components that the two components may be consolidated into a single component. The determined number of instances is then stored as metadata.

At block 650, the learning algorithm uses the dynamic values obtained by the platform module and stored as metadata as input to classify or re-classify the application components. The learning algorithm may classify components from all applications that execute on a user device at once.

At block 660, the learning algorithm may update the memory type for each component, based on the dynamic parameters determined in blocks 620-640, which may comprise component attributes. Updating the memory type is optional, as it may be the case that the dynamic parameters do not indicate a different memory type is better when compared to the initial memory type association for each component. As discussed above with respect to component classification based on static parameters, dynamic classification may be based on values of a given component relative to all other components rather than based on meeting or failing to meet certain arbitrary values. A component may have been measured by static parameters to be suitable for DRAM execution if the component is relatively large and was determined by static measurement to be relatively write-intensive. That component may be re-classified as suitable for NVRAM execution if dynamic measurement indicates the component has relatively high power consumption, or is, in execution, relatively read-intensive.

At block 670 the learning algorithm may update the mapping of the application to a hardware profile based on the determined dynamic parameters and any updates to the memory type for individual components. For example, an application which initially included one NVRAM component and one DRAM component may have been initially mapped to a hardware profile specifying one NVRAM bank and one DRAM bank. If the NVRAM component is updated to also be a DRAM component, the application may receive an updating mapping to a hardware profile specifying only DRAM banks.

At block 680 the learning algorithm may update metadata of the application, if either the memory types or the hardware profile mapping was updated. Previous to being updated, the metadata may have included the initial component attributes as well as the initial hardware profile mapping.

In some cases, an application may be executed without previous analysis of static or dynamic parameters. If so, the application may be executed according to a default hardware profile mapping, which may specify only DRAM banks or only NVRAM banks. If an application is executed without previous analysis of static or dynamic parameters, the application may also be separated into components. Such separation may be done in order to allow the components of the application to be measured independently. The learning algorithm may be capable of executing in an unsupervised fashion. That is, the learning algorithm may perform unsupervised learning using applications and components which have not been previously classified or analyzed in any way. This is in contrast to supervised learning, where the learning algorithm may make use of previously existing classification information, based either on the analysis of static attributes (like those measured by an enhanced compiler) or hints as to execution provided by the developer of the application.

Figure 7:
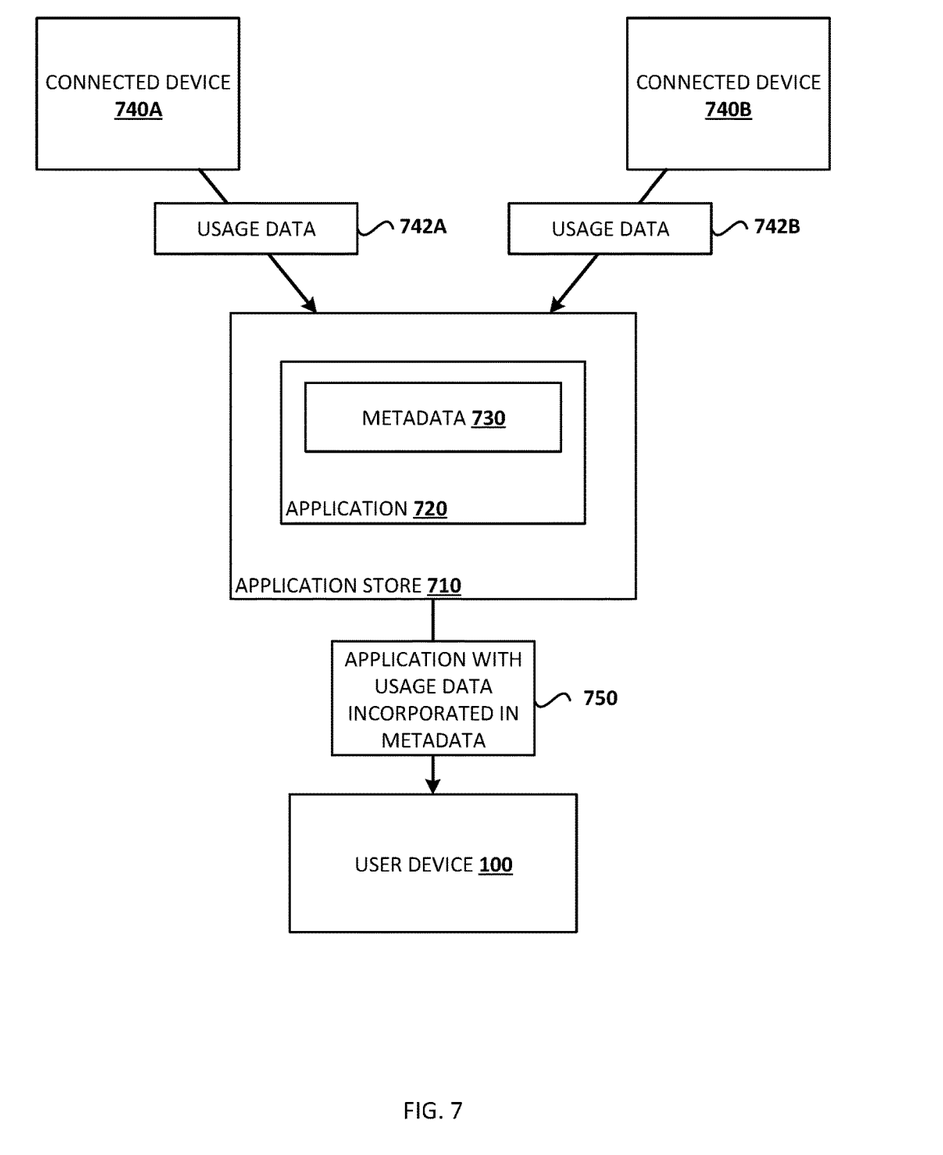
FIG. 7 is a diagram of an example networking system for collecting and distributing application metadata.

FIG. 7 is a diagram of an example networking system for collecting and distributing application metadata 730.

In addition to application metadata being generated and stored by a single device as described above with respect to FIG. 3 and FIG. 6, application metadata for an application may be generated by a plurality of devices. Metadata generated by a plurality of device may include more information than metadata generated by a single device, and so may be a more accurate representation of the application. In this example, application store 710 communicates with connected devices 740A and 740B to generate metadata for user device 100.

Application store 710 may include application 720, which itself includes metadata 730. Application store 710 may be used as a remote repository and distributor for application 720. Previous to this example, application store 710 may have distributed application 720 to connected devices 740A and 740B.

Connected devices 740A and 740B may, during execution of application 720, determine component attributes and a hardware profile mapping for application 720, stored as metadata. Determining component attributes and hardware profile mappings on connected devices 740A and 740B may be essentially the same as determining component attributes and hardware profile mappings on a single device. These component attributes and hardware profile mappings may be transmitted to application store 710 as usage data 742A and 742B.

Upon receiving usage data 742A and 742B, application store 710 may incorporate usage data 742A and 742B into metadata 730. That is, metadata 730 may be updated based on data received by connected devices 740A and 740B, which may be measurements of components of application 720. When component measurements are received from connected devices, such as 740A and 740B, application store 710 may incorporate these measurements into a repository of measurements. The repository of measurements may be a database of all measurements made for components of a given application. When new measurements are incorporated, the measurements may be averaged against those already in the data repository, e.g., by finding the mean or weighted average of all measurements for all component attributes, or by finding medians or modes of all measurements, or using other mathematical or statistical means to determine unique values of the measurement for the different parameters of the metadata from multiple inputs values for each of the different parameters of the metadata. In so doing, the component attributes and hardware profile mappings of metadata 730 may be based on data from a plurality of devices executing application 720. If so, metadata 730 may represent more complete and accurate information than would be possible if obtained from only a single device.

After updating metadata 730, application store 710 may transmit application 720 to user device 100, as an application with the usage data from connected devices 740A and 740B incorporated as metadata, represented in block 750. When user device 100 initially executes application 720 it may be able to do so efficiently without necessitating analysis of component attributes by user device 100. User device 100 may also be able to refine execution of application 720 based on the metadata received from application store 710.

Figure 8:
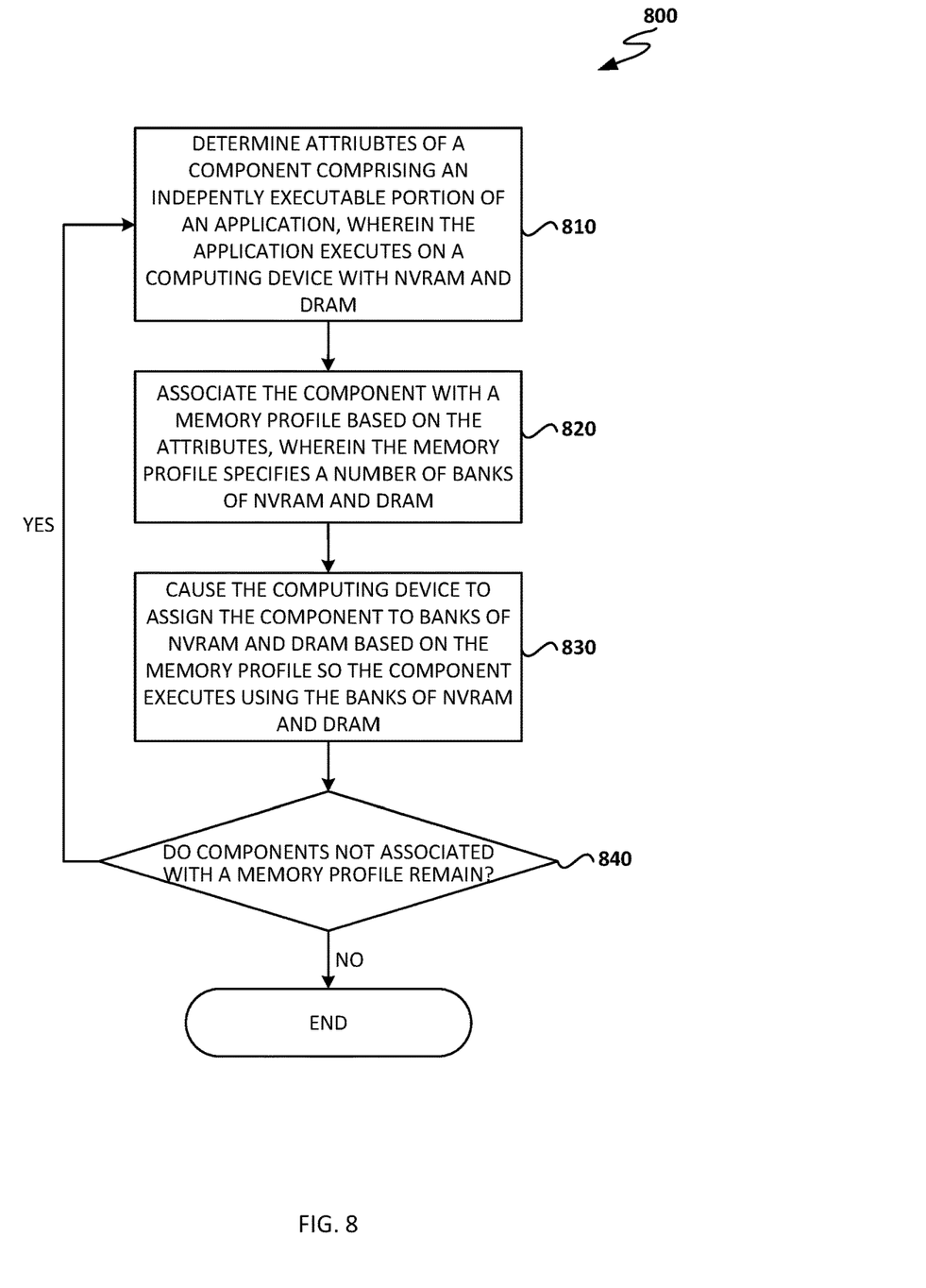
FIG. 8 illustrates example operations that may be performed by a learning algorithm to map applications to memory of a user device, wherein the memory of the user devices comprises NVRAM and DRAM, in accordance with certain aspects of the present disclosure.

FIG. 8 illustrates example operations 800 that may be performed a learning algorithm to map applications to memory of a user device, wherein the memory of the user devices comprises NVRAM and DRAM, in accordance with certain aspects of the present disclosure. In some instances, the learning algorithm may execute on the user device or may execute on computing device remote from the user device. In some embodiments, the learning algorithm may transmit indications of a component being mapped to a memory type to the user device. Operations 800 begin at 810 by the learning algorithm determining attributes of a component comprising an independently executable portion of an application, wherein the application executes on the user device. At 820, the learning algorithm associates the component with a memory profile based on the attributes, wherein the memory profile specifies a number of banks of NVRAM and a number of banks of DRAM. At 830, the learning algorithm causes the computing device to assign the component to banks of NVRAM and DRAM based on the memory profile, so that the component executes using the banks of NVRAM and DRAM. At 840, the learning algorithm repeats 810-830 if there are components remaining in the application not yet associated with a memory profile.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for allocating memory resources of a computing device comprising non-volatile random access memory (NVRAM) and dynamic random access memory (DRAM), the method comprising:

for each of one or more components of one or more applications to be executed on the computing device, wherein each of the one or more components comprises an independently executable portion of the one or more applications:

determining attributes of the component;

associating the component with a memory profile of a plurality of memory profiles based on the attributes, wherein each memory profile of the plurality of memory profiles specifies a number of banks of the NVRAM and a number of banks of the DRAM; and causing the computing device to generate an assignment of the component to banks of the NVRAM and DRAM based on the memory profile associated with the component so the computing device can execute the component using the banks of the NVRAM and DRAM based on the assignment.

2. The method of claim 1, further comprising:

clustering the one or more components into one or more classifications based on the attributes of each of the one or more components; and for each of the one or more classifications, associating the classification with one of the plurality of memory profiles, wherein associating the component with the memory profile based on the attributes comprises associating the component with the memory profile that is the one of the plurality of memory profiles associated with a classification including the component.

3. The method of claim 1, wherein causing the computing device to generate the assignment comprises transmitting an indication to the computing device associating the component with the memory profile.

4. The method of claim 1, further comprising, for each of one or more components, executing the component using the banks of the NVRAM and DRAM based on the assignment.

5. The method of claim 1, wherein determining attributes of the component comprises receiving attributes of the component from one or more devices.

6. The method of claim 1, wherein determining attributes of the component comprises generating the attributes of the component based on at least one of compiling or executing the component.

7. The method of claim 1, wherein the attributes comprise a static access ratio of the component and a size of the component, wherein the static access ratio of the component comprises a ratio of instructions to store data in memory over instructions to read data from memory determined based on compilation of the component, and wherein the size of the component is determined based on compilation of the component.

8. The method of claim 1, wherein the attributes comprise a dynamic access ratio of the component, an execution time of the component, and a power consumption of the component, wherein the dynamic access ratio of each of the component comprises a ratio of instances of storing data in memory over instances of reading data from memory during execution of the component, the execution time of the component is determined by measuring a number of CPU cycles needed to execute the component, and wherein the power consumption of the component is determined based on execution of the component.

9. The method of claim 8, wherein each of the one or more components of the one or more applications has an association with an initial memory profile of the plurality of memory profiles, and wherein, for each of the one or more components:
associating the component with the memory profile of the plurality of memory profiles based on the attributes comprises updating the association from the initial memory profile to the memory profile by evaluating attributes of the component, wherein the attributes of the component are obtained by one of:
generating attributes of the component based on execution of the component; or
receiving attributes of the components from one or more devices.

10. The method of claim 1, wherein the attributes comprise performance, power, and size attributes of the component.

11. The method of claim 1, further comprising separating at least one of the one or more applications into a plurality of components based on communication restraints between each component of the plurality of components.

12. The method of claim 1, further comprising organizing each of the one or more components into a clustering, wherein the clustering comprises a plurality of components with similar attributes and which may be similarly executed.

13. The method of claim 1, wherein associating the component with a memory profile comprises executing an unsupervised learning algorithm.

14. A system comprising:
a processor; and
a memory comprising executable instructions, which when executed by the processor, cause the system to perform an operation for allocating memory resources of a computing device comprising non-volatile random access memory (NVRAM) and dynamic random access memory (DRAM), the operation comprising:
for each of one or more components of one or more applications to be executed on the computing device, wherein each of the one or more components comprises an independently executable portion of the one or more applications:
determining attributes of the component;
associating the component with a memory profile of a plurality of memory profiles based on the attributes, wherein each memory profile of the plurality of memory profiles specifies a number of banks of the NVRAM and a number of banks of the DRAM; and
causing the computing device to generate an assignment of the component to banks of the NVRAM and DRAM based on the memory profile associated with the component so the computing device can execute the component using the banks of the NVRAM and DRAM based on the assignment.

15. The system of claim 14, the operation further comprising:
clustering the one or more components into one or more classifications based on the attributes of each of the one or more components; and
for each of the one or more classifications, associating the classification with one of the plurality of memory profiles,
wherein associating the component with the memory profile based on the attributes comprises associating the component with the memory profile that is the one of the plurality of memory profiles associated with a classification including the component.

16. The system of claim 14, wherein causing the computing device to generate the assignment comprises transmitting an indication to the computing device associating the component with the memory profile.

17. The system of claim 14, the operation further comprising, for each of one or more components, executing the component using the banks of the NVRAM and DRAM based on the assignment.

18. The system of claim 14, wherein determining attributes of the component comprises receiving attributes of the component from one or more devices.

19. The system of claim 14, wherein determining attributes of the component comprises generating the attributes of the component based on at least one of compiling or executing the component.

20. A non-transitory computer-readable storage medium storing instructions, which, when executed on a processor, perform a method for allocating memory resources of a computing device comprising non-volatile random access memory (NVRAM) and dynamic random access memory (DRAM), the method comprising:
for each of one or more components of one or more applications to be executed on the computing device, wherein each of the one or more components comprises an independently executable portion of the one or more applications:
determining attributes of the component;
associating the component with a memory profile of a plurality of memory profiles based on the attributes, wherein each memory profile of the plurality of memory profiles specifies a number of banks of the NVRAM and a number of banks of the DRAM; and
causing the computing device to generate an assignment of the component to banks of the NVRAM and DRAM based on the memory profile associated with the component so the computing device can execute the component using the banks of the NVRAM and DRAM based on the assignment.

* * * * *